(12) United States Patent
Janssen et al.

(10) Patent No.: US 11,798,593 B2
(45) Date of Patent: Oct. 24, 2023

(54) MAGNETIC TAPE MEDIA CARTRIDGE WITH INCREASED TAPE MEDIA CAPACITY

(71) Applicant: QUANTUM CORPORATION, San Jose, CA (US)

(72) Inventors: Clark Janssen, Loveland, CO (US); Joe K. Jurneke, Brighton, CO (US); Turguy Goker, Vista, CA (US); James P. Peng, Santa Maria, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 17/081,816

(22) Filed: Oct. 27, 2020

(65) Prior Publication Data

US 2021/0125638 A1 Apr. 29, 2021

Related U.S. Application Data

(60) Provisional application No. 62/926,994, filed on Oct. 28, 2019.

(51) Int. Cl.
*G11B 23/107* (2006.01)
*G11B 23/04* (2006.01)
*G11B 23/07* (2006.01)

(52) U.S. Cl.
CPC .......... *G11B 23/107* (2013.01); *G11B 23/044* (2013.01); *G11B 23/07* (2013.01)

(58) Field of Classification Search
None
See application file for complete search history.

(56) References Cited

U.S. PATENT DOCUMENTS

| | | | | |
|---|---|---|---|---|
| 3,856,235 A | * | 12/1974 | Wallace | G11B 23/08757 242/346.2 |
| 4,114,833 A | * | 9/1978 | Liepold | G11B 23/08757 242/346.2 |
| 5,027,249 A | * | 6/1991 | Johnson et al. | G11B 23/107 360/132 |
| 5,284,308 A | | 2/1994 | Comeaux et al. | |

(Continued)

OTHER PUBLICATIONS

U.S. Appl. No. 16/404,552, filed May 6, 2019, Applicant Quantum Corporation, with its entire prosecution and file history. (related matter: 11198.148).

*Primary Examiner* — Craig A. Renner
(74) *Attorney, Agent, or Firm* — ROEDER & BRODER LLP; James P. Broder

(57) ABSTRACT

A tape media cartridge includes a cartridge housing having a standard form factor, a cartridge reel that is coupled to and retained within the cartridge and a tape media. The tape media can be selectively wound onto the cartridge reel between a fully wound state, a partially wound state and an unwound state. The tape media forms a media hollow cylinder having a media outer diameter and a media inner diameter that varies depending upon the state of the tape media. When the tape media is in the fully wound state, the tape media has a ratio of the media outer diameter to media inner diameter of at least approximately 95:43. The cartridge housing can include a side wall having a wall center and wall edge, the side wall having a side wall thickness that gradually increases from the side wall center to the side wall edge.

20 Claims, 6 Drawing Sheets

(56) References Cited

U.S. PATENT DOCUMENTS

| | | | | |
|---|---|---|---|---|
| 5,986,859 | A * | 11/1999 | Nishiyama et al. | G11B 23/08757 360/132 |
| 6,315,230 | B1 * | 11/2001 | Hansen et al. | G11B 23/107 360/132 |
| 7,440,231 | B2 | 10/2008 | Sachuk | |
| 2002/0074440 | A1 * | 6/2002 | Kiso | G11B 23/037 242/345 |
| 2002/0109028 | A1 * | 8/2002 | Ishihara et al. | G11B 23/107 242/348.2 |
| 2003/0117747 | A1 * | 6/2003 | Kunikata et al. | G11B 23/037 360/134 |
| 2004/0129818 | A1 * | 7/2004 | Sugawara et al. | G11B 15/43 242/334.6 |
| 2006/0043229 | A1 * | 3/2006 | Takahashi et al. | B65H 18/10 242/547 |
| 2008/0218901 | A1 * | 9/2008 | Haustein et al. | G11B 23/107 360/90 |
| 2008/0223971 | A1 * | 9/2008 | Shiga | G11B 23/107 242/348.2 |
| 2009/0218430 | A1 * | 9/2009 | Mori | G11B 23/037 242/348 |
| 2013/0206890 | A1 * | 8/2013 | Hiraguchi | G11B 23/044 242/358 |
| 2020/0357441 | A1 * | 11/2020 | Goker et al. | G11B 23/044 |

* cited by examiner

MAGNETIC TAPE MEDIA CARTRIDGE WITH INCREASED TAPE MEDIA CAPACITY

RELATED APPLICATION

This application claims priority on U.S. Provisional Application Ser. No. 62/926,994, filed on Oct. 28, 2019, and entitled "IMPROVED MAGNETIC TAPE MEDIA CARTRIDGE". As far as permitted, the contents of U.S. Provisional Application Ser. No. 62/926,994 are incorporated in their entirety herein by reference.

BACKGROUND

Over the history of magnetic recording, there have always been tradeoffs associated with achieving high areal density. Disk has for many years been limited by limitations of achieving high areal density, but they have still driven the linear density as high as they can achieve based on super paramagnetic limitations. Recently, disk has moved to higher coercivity magnetic materials in its disk formulations and the use of HAMR (Heat Assisted Magnetic Recording) and MAMR (Microwave Assisted Magnetic Recording). Both of these technologies involve heating magnetic particles to a temperature at or above curie temperature, thereby causing the media coercivity to drop significantly where their write heads can effective magnetize the media. Once magnetized, the head source is removed, allowing the media to cool, and the coercivity to rise.

Magnetic tape cannot afford to dump heat into the media due to dimensional stability considerations. The application of heat would significantly affect nearby tracks, potentially permanently damaging the pre-written data.

In all the discussions about increasing areal density on tape, they all involve increases in both linear density and track density. Today, tape is a factor of two away from disk in linear density, and more than an order of magnitude in track density.

A 2:1 increase in the linear density can result in a cost factor of 6 dB in media signal-to-noise ratio (SNR), and a 12 dB cost factor in amplitude. Increases in the linear density may results in having to reduce the head media separation, smaller head gap lengths, and smaller particles used in magnetic coatings of media—all of which are difficult to achieve, and requires significant investment in technology and processes. Similarly, a 2:1 change in the track density can have a cost factor of 3 dB in signal-to-noise ratio and a 6 dB cost factor in amplitude—all of which are much less than the similar change in the linear density.

Generation after generation the INSIC roadmap has called out increases in both parameters. This results in requiring new media formulations for every generation of products. Recouping investment in tape manufacturing is unrealistic with this model.

Magnetic data cartridge storage capacity is a key metric for the data storage marketplace. The capacity increases roughly two-fold on each release of a new generation. The previous methods of increasing capacity: tape thickness reduction, lateral track density, and longitudinal bit density, do not change the volumetric efficiency of the cartridge. Each of the previous methods for increasing capacity present challenges in manufacture, available technology and design margins.

SUMMARY

The present invention is directed toward a tape cartridge that includes a cartridge housing, a cartridge reel and a tape media. The cartridge housing houses the cartridge reel and tape media and has a standard Ultrium™ form factor. The cartridge reel is coupled to and retained within the cartridge housing. The cartridge housing can be formed around a cartridge housing interior portion. The cartridge reel includes a cartridge hub and cartridge flanges. The tape media is selectively wound onto the cartridge reel. The tape media can be selectively wound between a fully wound state, a partially wound state and an unwound state. The tape media includes a magnetic tape that is configured to store data. The tape media forms a media hollow cylinder. The media hollow cylinder has a media outer diameter and a media inner diameter that vary depending upon the state of the tape media. When the tape media is fully wound, a ratio of the media outer diameter to the media inner diameter can be at least approximately 95:43.

In certain embodiments, the tape media cartridge housing can include a side wall having a wall center and a wall edge. The side wall can have a side wall thickness that gradually increases from the side wall center to the side wall edge.

In some embodiments, the tape media can have a media width so that a ratio of the media inner diameter to the media width is less than approximately 43:13.

In various embodiments, the tape media can a ratio of the media outer diameter to the media width is at least approximately 95:13.

In certain embodiments, the cartridge reel can include a reel flange having an outer edge radius of curvature of less than 0.4 mm.

In some embodiments, the cartridge reel can include a reel flange having a flange thickness of less than 2.90 mm.

In various embodiments, when the tape media is in the fully wound state, a ratio of the media inner diameter to the media outer diameter can be approximately 95:42.

In certain embodiments, the media inner diameter can be less than 43 mm.

In some embodiments, the media outer diameter can be greater than 95 mm.

In various embodiments, the media width can be greater than 13 mm.

In certain embodiments, when the tape media is in the fully wound state, the media hollow cylinder has a volume of at least 20.8 cm$^3$.

In some embodiments, the cartridge housing can be at least partially formed with a glass filling.

The present invention is also directed toward a tape media cartridge that includes a cartridge housing, a cartridge reel and a tape media. The cartridge reel includes a hub. The tape media can be selectively wound onto the hub of the cartridge reel. The tape media has a tape width. The tape media forms a media hollow cylinder having a media inner diameter so that a ratio of the media inner diameter to the media width is less than approximately 43:13.

In various embodiments, the tape media can be selectively wound onto the cartridge reel between a fully wound state, a partially wound state and an unwound state, in the fully wound state the tape media has a volume of at least approximately 25 cm$^3$.

In certain embodiments, the cartridge reel can include a reel flange having an outer edge radius of curvature of approximately 0.2 mm.

In some embodiments, the cartridge reel can include a reel flange having a flange thickness of less than 2.90 mm.

In various embodiments, the cartridge housing can include a side wall having a wall center and a wall edge, the side wall having a side wall thickness that gradually increases from the side wall center to the side wall edge.

In certain embodiments, the cartridge housing can be at least partially formed with a glass filling.

In some embodiments, the cartridge reel can include a reel flange, the reel flange being at least partially formed with a glass filling.

The present invention is also directed toward a tape media cartridge that includes a cartridge housing, a cartridge reel and a tape media. The cartridge reel is coupled to and retained within the cartridge housing. The cartridge reel includes a reel flange. The reel flange has an outer edge radius of curvature of less than 0.3 mm. The reel flange has a flange thickness of less than 2.85 mm. The tape media can be selectively wound onto the hub of the cartridge reel between a fully wound state, a partially wound state and an unwound state. The tape media has a tape media width. The tape media forms a media hollow cylinder having a media inner diameter and a media outer diameter that can vary depending on the state of the tape media. When the tape media is fully wound, the ratio of the media outer diameter to the media inner diameter is at least approximately 95:43. In the same state, the ratio of the media inner diameter to the media width is less than approximately 40:13.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a magnetic tape media cartridge having an improved media capacity. More specifically, the magnetic tape cartridge can be effectively utilized to provide more media capacity while conforming to the standard-form factor of magnetic cartridges in the industry, such as the Ultrium™ form factor. As a result, the tape drives and the magnetic tape library as a whole can still utilize the improved magnetic tape cartridge.

Those of ordinary skill in the art will realize that the following detailed description of the present invention is illustrative only and is not intended to be in any way limiting. Some embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
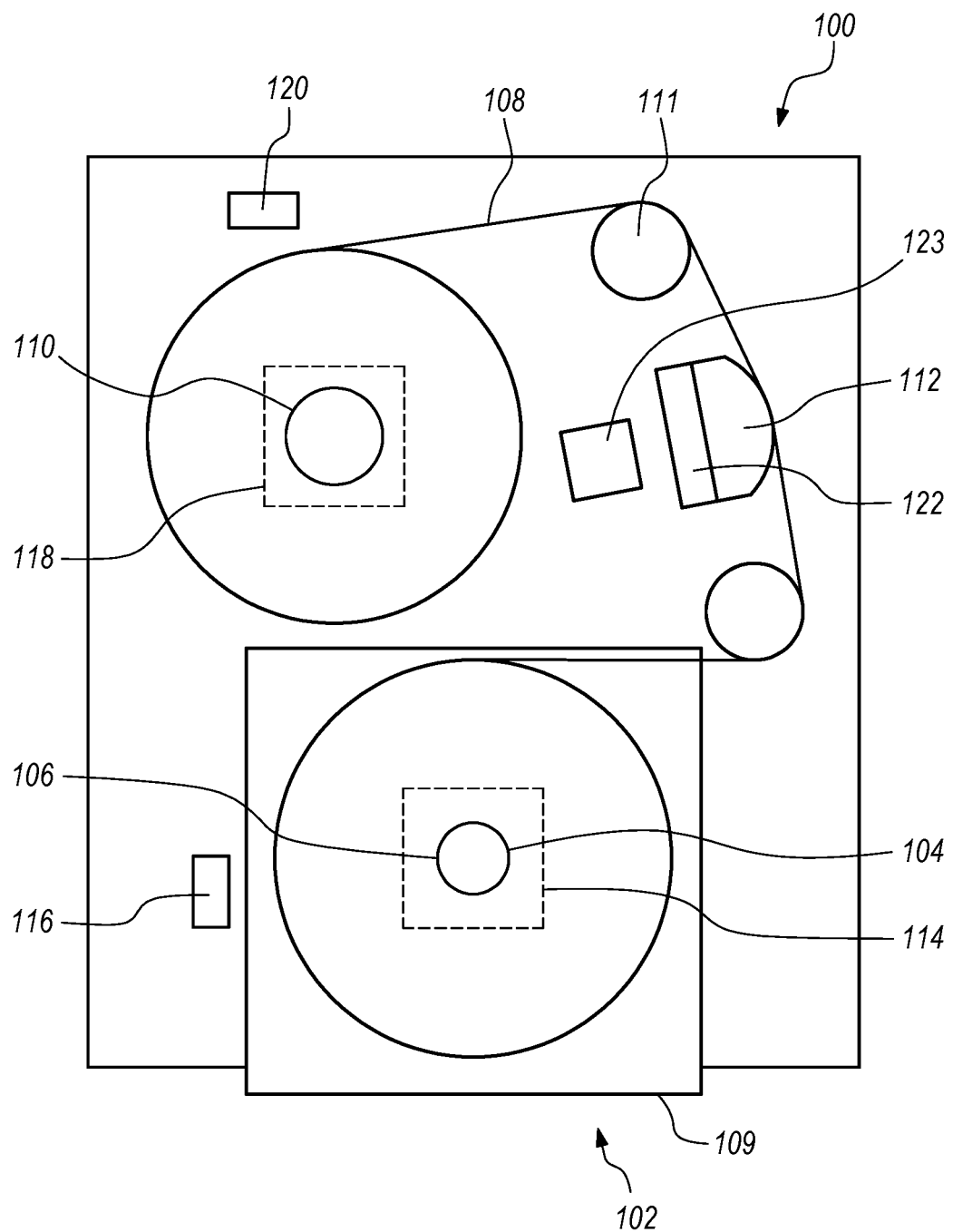
FIG. 1 is a simplified schematic top view illustration of a tape drive and magnetic tape cartridge.

FIG. 1 is a simplified schematic top view illustration of a magnetic tape drive 100 (also referred to herein simply as a "tape drive"), and an embodiment of a magnetic tape media cartridge 102 (also referred to herein as a "tape cartridge") having features of the present invention that has been inserted into the tape drive 100. It is appreciated that the tape drive 100, as shown in FIG. 1, represents a generic tape drive, and is shown by way of example and not by way of limitation. In some embodiments, the tape drive 100 operates in compliance with an LTO specification, such as LTO-6, LTO-7 or LTO-8. Stated in another manner, in such embodiments, the tape cartridge 102 is an LTO compatible tape cartridge.

During use of the tape drive 100, the tape cartridge 102 is inserted into the tape drive 100 to read data from and/or write data to the tape cartridge 102. The design of the tape cartridge 102 can vary. As illustrated in FIG. 1, the tape cartridge 102 includes a cartridge reel 104 and magnetic tape 108. The cartridge reel 104 includes a cartridge hub 106. The cartridge reel 104 is selectively coupled to the cartridge housing 109. The cartridge reel 104 selectively holds and/or retains the magnetic tape 108.

The tape cartridge 102 supplies the magnetic tape 108 to the tape drive 100. More particularly, when the tape cartridge 102 is inserted into the tape drive 100, one end of the magnetic tape 108 is taken up within the tape drive 100 to be wrapped around a drive reel 110 included in the tape drive 100. The magnetic tape 108 traverses a predefined path between the cartridge reel 104 and the drive reel 110, which is defined, a least in part, by one or more rollers 111 (two are shown in FIG. 1) positioned at strategic positions along the predefined path. The rollers 111 may also aid in limiting gross lateral movement (i.e. in and out of the page as shown in FIG. 1) of the magnetic tape 108, i.e. lateral tape motion or "LTM".

The tape cartridge 102 generally includes a substantially rectangular cartridge housing 109 that encloses a tape media. The cartridge housing 109 can include at least six walls defining a substantially rectangular shape and having a top cartridge housing portion and a bottom cartridge housing portion. Additionally, the cartridge housing 109 can include a cartridge housing exterior portion and a cartridge housing interior portion. The tape cartridge 102 may further include a cartridge door to protect the magnetic tape 108 therein and a cartridge leader, which is exposed when the cartridge door is open.

The cartridge housing 109 can have a standard Ultrium™ form factor. In some embodiments, the cartridge housing 109 may be at least partially formed with a glass filling. The cartridge housing 109 can be formed from suitable materials including glass, plastics, metals, adhesives, or any other suitable material(s). The size, shape, configuration, and the design of the cartridge housing 109 can vary depending on the design requirements of the tape cartridge 102.

Along the predefined path, the drive reel 110 moves the magnetic tape 108 across a head 112, e.g., a read/write head that is configured to read data from and/or write data to the magnetic tape 108. In particular, the head 112 is positioned in close proximity to the predefined path of the magnetic tape 108 such that as the magnetic tape 108 travels in the longitudinal direction (by being wound from the cartridge reel 104 to the drive reel 110 or vice versa) the head 112 can read/write data to a particular track and longitudinal position of the magnetic tape 108. Additionally, the head 112 can include one or more servo elements configured to read the servo track(s) of the magnetic tape 108.

In some embodiments, as shown, the tape drive 100 can also include a cartridge reel motor 114 (illustrated as a box in phantom) that generates the necessary force to rotate the cartridge reel 104 at will, and a cartridge reel encoder 116, e.g., a sensor or detector, that is configured to output signals representing the pulse rate (or rotation rate) of the cartridge reel motor 114. Additionally, the tape drive 100 can further include a drive reel motor 118 (illustrated as a box in phantom) that generates the necessary force to rotate the drive reel 110 at will, and a driver reel encoder 120, e.g., a sensor or detector, that is configured to output signals representing the pulse rate (or rotation rate) of the drive reel motor 118.

As illustrated in this embodiment, the tape drive 100 also includes an actuator 122 and a controller 123 that can be communicatively coupled to the head 112. The actuator 122 is configured to control the lateral position of the head 112 relative to the magnetic tape 108 based on a signal provided by the controller 123. As such, the actuator 122 comprises a mechanical positioner to move the head 112 up or down laterally. By controlling the lateral position of the head 112 relative to the magnetic tape 108, a particular track of the magnetic tape 108 can be accessed as desired.

The controller 123 is in communication with the actuator 122 and a number of other components within the tape drive 100. For example, although not specifically shown in FIG. 1, each of the cartridge reel motor 114, the cartridge reel encoder 116, the drive reel motor 118, and the driver reel encoder 120 can be in communication with the controller 123. As such, the controller 123 can be configured to perform various specified operations, either individually, or in combination with other software, hardware and/or firmware elements.

Additionally, or in the alternative, in some embodiments, the tape drive 100 can include additional heads and associated actuators so that more than one track of the magnetic tape 108 can be read from and/or written to simultaneously. For example, the servo track may have a dedicated head and the data tracks may use a separate head. Further, the head 112 may comprise two discrete components, i.e. one head for read operations and another head for write operations.

The tape drive 100 may be installed within or associated with a computer (not shown) or computer network. Additionally, the tape drive 100 may be used as part of an automated tape library having a plurality of tape cartridges and a robotic transfer mechanism to transport cartridges to one or more tape drives.

The magnetic tape 108 stores information in a form, e.g., digital, that may be subsequently retrieved if desired. Typically, the magnetic tape 108 includes a storage surface on one side of the magnetic tape 108 that may be divided into a plurality of parallel tracks along the length of magnetic tape 108. Alternatively, the data may be recorded in diagonal strips across the magnetic tape 108. The tape media generally has a linear density, a track density, and an areal density. Each of the densities can be individually altered to meet the design requirements of the tape media, the tape media cartridge and/or the tape drive.

Various other features of a tape drive may be included, for example, tension ramps, various buckler systems, rollers, tape guides, receiving mechanisms, dampers, and the like may be included. In one embodiment, the magnetic tape 108 can have an induced stress distribution using a tension ramp at an inner wrap region of the magnetic tape 108. If the compressive stress exceeds a certain maximum value then the pack is at risk of becoming unstable and damage to the magnetic tape 108 may occur.

Further, various examples herein are described with reference to magnetic tape drives; it will be understood by one of ordinary skill in the art, however, that the description of magnetic tape drives, tape media cartridges, and tape media is illustrative only and the exemplary systems and methods are applicable to various data storage tape drives including, but not limited to, magnetic, optical, and magnetic/optical drive systems.

Figure 2:
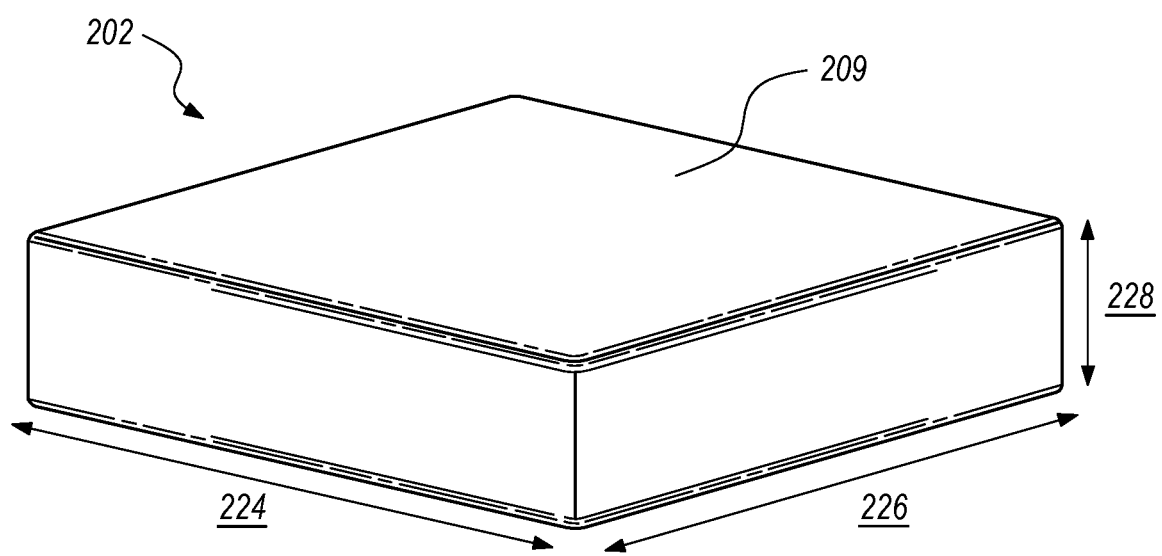
FIG. 2 is a simplified schematic perspective view of a magnetic tape cartridge.

FIG. 2 is a simplified schematic perspective view illustration of an embodiment of the tape cartridge 202. More particularly, the tape cartridge housing 209 can have a size and shape that is suitable for use within a standard tape drive. For example, as shown, the tape cartridge housing 209 is substantially rectangular box-shaped, including a tape cartridge housing length 224, a tape cartridge housing width 226, and a tape cartridge housing height 228. Additionally, in one non-exclusive, non-limiting example the tape cartridge 202 can have dimensions including a tape cartridge housing length 224 of approximately 102.00 millimeters a tape cartridge housing width 226 of 105.40 millimeters, and a tape cartridge housing height 228 of approximately 21.50 millimeters. Alternatively, the tape cartridge 202 can have a different shape and/or have different dimensions than those specifically noted herein.

Figure 3:
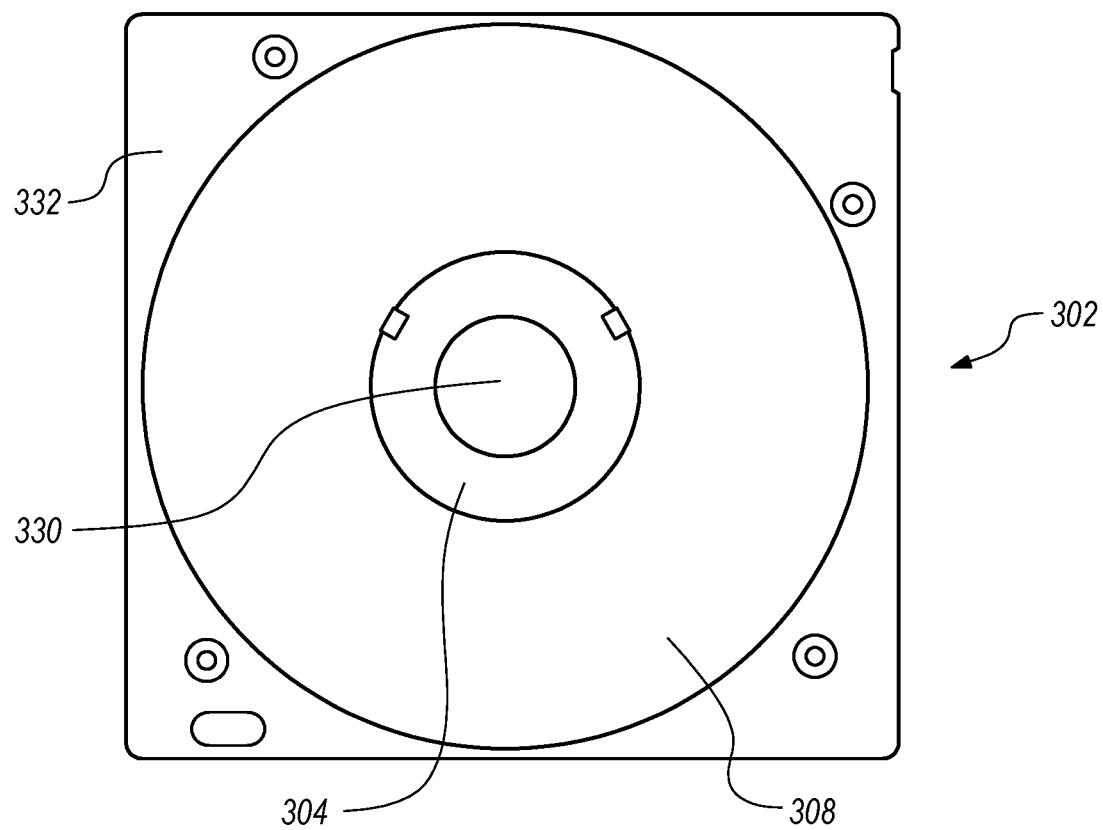
FIG. 3 is a simplified schematic top view of a magnetic tape cartridge with the top wall of the cartridge removed.

FIG. 3 is a simplified schematic top view illustration of a portion of still yet another embodiment of the tape cartridge 302, and a magnetic tape 308 that can be retained by the cartridge reel 304 within the tape cartridge 302. The cartridge reel 304 can have a cartridge reel hollow cylinder 330. In one embodiment, changes can be made to the cartridge housing interior portion 332 in order to enable the tape cartridge 302 to accommodate the magnetic tape 308 having a tape length and a tape width that are somewhat greater than previous tape cartridges.

The cartridge reel hollow cylinder 330 can have modified dimensions depending on the design requirements of the tape cartridge 302 and magnetic tape 308. In certain embodiments, the height of the cartridge reel hollow cylinder 330 can be increased to accommodate a magnetic tape 308 of a greater width. In other embodiments, the cartridge reel hollow cylinder 330 (sometimes referred to herein as "media hollow cylinder") can have a reduced diameter in order to accommodate a magnetic tape 308 with a reduced inner diameter.

More specifically, as shown in FIG. 3, the tape cartridge 302 is again substantially rectangular box-shaped. The top and the bottom are not shown in FIG. 3. Additionally, the tape cartridge 302 again includes the cartridge housing interior portion 332 that forms the exterior shell casing for the tape cartridge 302. As illustrated in FIG. 3, modifications have been made to the cartridge housing interior portion 332 to enable the flange assembly containing the magnetic tape 308 to have an outer diameter that is somewhat greater than previous designs. In some embodiments, the cartridge housing interior portion 332 can have a cartridge housing interior portion bottom portion (not shown) with an increased clearance to allow for the magnetic tape 308 to have a greater width. In certain embodiments, the cartridge reel 304 can have a cartridge reel radius that is reduced to allow for more magnetic tape 308 to be stored on the cartridge reel 304.

Figure 4:
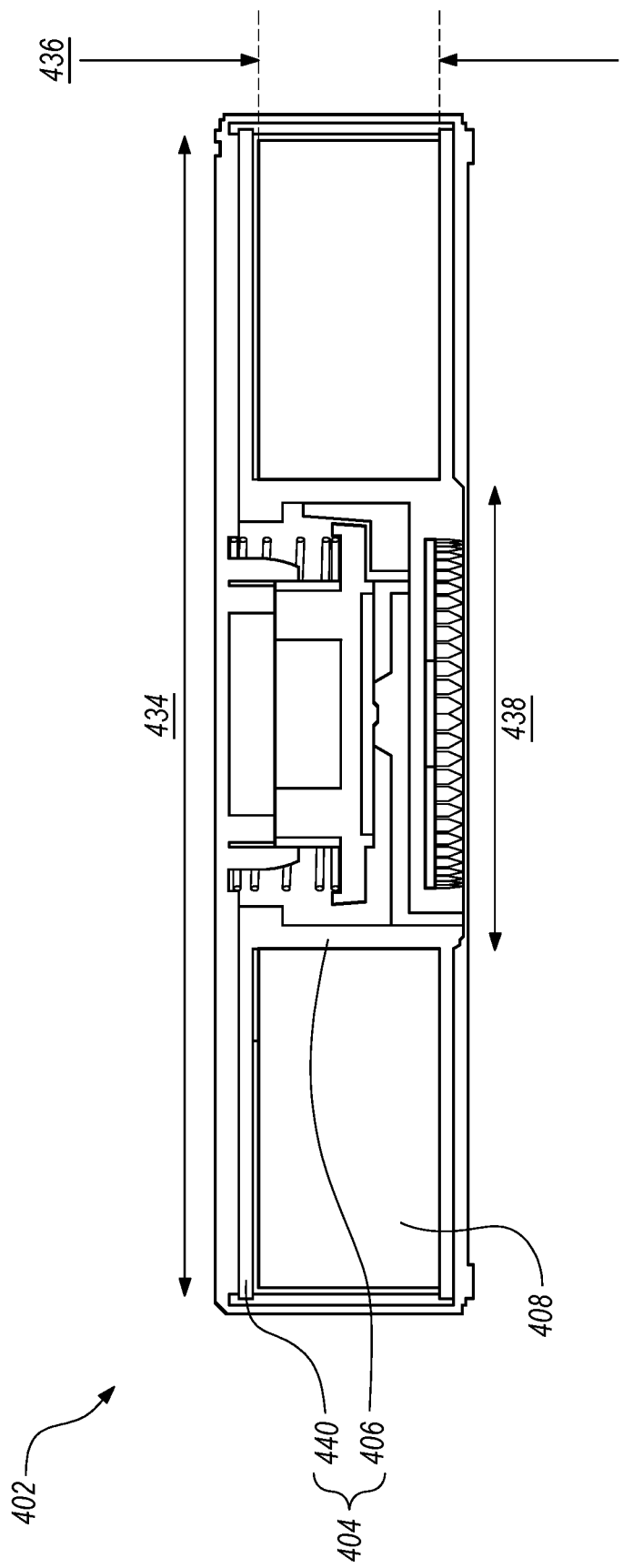
FIG. 4 is a cross-sectional schematic front view of an embodiment of a magnetic tape cartridge having features of the present invention.

FIG. 4 is a simplified schematic cutaway view illustration of the tape cartridge 402. More specifically, FIG. 4 illustrates various structures and/or components included within the tape cartridge 402, as well as certain dimensions of such structures. Additionally, FIG. 4 further illustrates certain size possibilities for a tape length and a tape width (also referred to herein as a "media width") of a magnetic tape 408 that can be retained within the tape cartridge 402 due to the modifications, presence and size of such structures.

The cartridge reel 404 is coupled to and retained within the cartridge housing. The cartridge reel 404 includes and/or defines a cartridge hub 406. In some embodiments, the cartridge reel 404 may be at least partially formed with a glass filling. The cartridge reel 404 can be formed from suitable materials including glass, plastics, metals, adhesives, or any other suitable material(s). The size, shape, configuration, and the design of the cartridge reel 404 can vary depending on the design requirements of the tape cartridge 402.

A magnetic tape 408 (also referred to herein as a "tape media") is spooled about the cartridge hub 406 of the cartridge reel 404. The magnetic tape 408 can also be selectively wound onto the cartridge hub 406 between a fully wound state, a partially wound state and an unwound state, the magnetic tape 408 forming a media hollow cylinder having a media outer diameter (also referred to herein as a "tape outer diameter") and a media inner diameter (also referred to herein as a "tape inner diameter") that varied depending upon the state of the tape media. In certain embodiments, the magnetic tape 408 can include at least one servo track (not shown) and a plurality of data tracks (not shown) that run along a longitudinal length of the magnetic tape 408.

When the magnetic tape 408 is in a fully wound state, the magnetic tape 408 can have a ratio of the media outer diameter to the media inner diameter. In certain embodiments, when the magnetic tape 408 is in a fully wound state, the media hollow cylinder can have a volume of at least 20.8 cm$^3$. Alternatively, when the magnetic tape 408 is in a fully wound state, the media hollow cylinder can have a volume of less than 20.8 cm$^3$. In various embodiments, when the magnetic tape 408 is in a fully wound state the magnetic tape 408 can have a volume of approximately 29 cm$^3$. In some embodiments, the when the magnetic tape 408 is in a fully wound state the magnetic tape 408 can have a volume of greater than 29 cm$^3$. Additionally, each of these tracks can be positioned substantially parallel to each other. The volume of the tape cartridge 402 can be 231 cm$^3$ while the volume of the tape media 102 used to store data can be 20.7 cm$^3$.

As provided herein, the changes to the structure of the tape cartridge 402 enable the use of a magnetic tape 408 having a tape outer diameter 434 and/or a tape width 436 that are substantially greater than what was possible in previous designs. Additionally, the changes of the tape cartridge 402 enable the use of a magnetic tape 408 having a tape inner diameter 438 that is lesser than what was possible in previous designs. Thus, the desire to increase the amount of data that can be read from and/or written to any given magnetic tape cartridge, by increasing the size of the magnetic tape 408, e.g., the length and/or the width of the magnetic tape 408, that can be retained within a given magnetic tape cartridge, can be achieved through use of the tape cartridge 402 of the present invention. As such, the recording tape area of the magnetic tape 408 can be greatly increased even when using magnetic tape 408 of a standard tape thickness.

For example, as shown in FIG. 4, the tape cartridge 402 includes the cartridge reel 404 that can include the cartridge hub 406 and cartridge flanges 440 that form the exterior around magnetic tape 408 and are coupled to the interior components of the tape cartridge 402. Importantly, as described in detail herein, the tape cartridge 402 is configured to enable the cartridge flanges 440 to be much smaller than previous designs. With smaller cartridge flanges 440 and a similar overall sized tape cartridge 402, it is appreciated that the tape cartridge 402 can provide a suitable housing for a magnetic tape 408 of increased tape length in comparison to what is possible in previous designs. Additionally, the tape cartridge 402 is further designed decrease the spacing between the magnetic tape 408 and the cartridge flanges 440, thus further expanding the size possibilities for the magnetic tape 408, e.g., the tape width 436 of the magnetic tape 434, within the tape cartridge 402.

The cartridge hub 406 can have modified dimensions depending on the design requirements of the tape cartridge 402 and magnetic tape 408. In certain embodiments, the height of the cartridge hub 406 can be increased to accommodate a magnetic tape 408 of a greater width. In some embodiments, the cartridge hub 406 can have a reduced diameter in order to accommodate a magnetic tape 408 with a reduced diameter. In various embodiments, the cartridge hub 406 can have a reduced thickness in order to accommodate a magnetic tape 408 with a reduced diameter. The cartridge hub 406 may have a position within the tape cartridge 402 that varied depending on whether the tape cartridge 402 is inserted into a tape drive or into a library. In some embodiments, the cartridge hub 406 can be substantially centered when inserted into tape drive or library.

Further, in some embodiments, the design of the tape cartridge 402, e.g., with the cartridge flanges 440 having a lesser thickness than previous designs, enables a maximum wound tape width 436 of between approximately 12.70 millimeters and 15.51 millimeters. More particularly, in one non-exclusive embodiment, the tape cartridge 402 has a maximum wound tape width 436 of approximately 15.50 millimeters. Alternatively, in some embodiments, the tape cartridge 402 has a maximum wound tape width 436 of greater than approximately 15.00 millimeters or less than approximately 12.50 millimeters.

In certain embodiments, the ratio of the tape outer diameter 434 to the tape inner diameter 438 for the magnetic tape 408 usable with the tape cartridge 402 illustrated and described herein can be between approximately 2.00:1 and 6.00:1. In some such non-exclusive embodiments, the ratio of the tape outer diameter 434 to the tape inner diameter 438 for the magnetic tape 408 usable with the tape cartridge 402 can be approximately 2.00:1, 2.05:1, 2.10:1, 2.15:1, 2.20:1, 2.25:1, 2.50:1, 2.75:1, 3.00:1, 3.25:1, 3.50:1, 3.75:1, 4.00:1, 4.25:1, 4.50:1, 4.75:1, 5.00:1, 5.25:1, 5.50:1, 5.75:1 or 6.00:1. More particularly, in one non-exclusive alternative embodiment, as the magnetic tape 408 is wound (and unwound) around the cartridge hub 406, the magnetic tape 408 has an inner diameter (i.e. tape inner diameter 438) of approximately 43.00 millimeters, and an outer diameter (i.e. tape outer diameter 434) of approximately 95.00 millimeters. Stated in another manner, in such embodiment, the ratio of the tape outer diameter 434 to the tape inner diameter 438 of the magnetic tape 408 usable within the tape cartridge 402 is approximately 2.21:1. Alternatively, in some embodiments, the ratio of the tape outer diameter 434 to the tape inner diameter 438 for the magnetic tape 408 usable with the tape cartridge 402 can be greater than approximately 6.00:1 or less than approximately 2.00:1. Still further, in some embodiments, the ratio tape outer diameter 434 can be greater than approximately 95.00 millimeters and the tape inner diameter 438 can be lesser than approximately 43.00 millimeters.

In some embodiments, the ratio of the tape inner diameter 438 to the tape width 436 for the magnetic tape 408 usable with the tape cartridge 402 illustrated and described herein can be between approximately 3.50:1 and 2.00:1. In some such non-exclusive embodiments the ratio of the tape inner diameter 438 to the tape width 436 for the magnetic tape 408 usable with the tape cartridge 402 can be approximately 2.00:1, 2.05:1, 2.10:1, 2.15:1, 2.20:1, 2.25:1, 2.50:1, 2.75:1, 3.00:1, 3.25:1, 3.30:1, 3.50:1. More particularly, in one non-exclusive alternative embodiment, as the magnetic tape 408 is wound (and unwound) around the cartridge hub, the magnetic tape 408 has a tape inner diameter 438 of approximately 43.00 millimeters, and a tape width 436 of approximately 13.00 millimeters. Stated in another manner, in such embodiment, the ratio of the tape inner diameter 438 to the tape width 436 of the magnetic tape 408 usable within the tape cartridge 402 is approximately 3:31:1. Alternatively, in some embodiments, the ratio of the tape inner diameter 438 to the tape width 436 for the magnetic tape 408 usable with the tape cartridge 402 can be greater than approximately 3.50:1 or less than approximately 2.00:1.

Thus, assuming a tape cartridge 402 having a standard cartridge height of approximately 21.50 millimeters, in certain embodiments, the tape cartridge 402 and the magnetic tape 408 cooperate to provide a tape width ratio (i.e. the ratio of the tape width 436 to the cartridge height) of between approximately 0.60:1 and 0.85:1. More particularly, in certain such non-exclusive embodiments, the tape cartridge 402 and the magnetic tape 408 cooperate to provide a tape width ratio of approximately 0.60:1, 0.65:1, 0.67:1, 0.70:1, 0.72:1, 0.75:1, 0.77:1, 0.80:1, 0.82:1 or 0.85:1. Alternatively, in some embodiments, the tape cartridge 402 and the magnetic tape 408 can cooperate to provide a tape width 436 ratio of greater than approximately 0.85:1 or less than approximately 0.60:1.

Sometimes, the tension profile for winding tape is held constant for each wrap. But, when more tape is added to the tape inner diameter 438 and the tape outer diameter 434 of the magnetic tape 408 sometimes the circumferential stress profile can change. In certain embodiments, adding a tension ramp can keep the compressive stress at desired profiles. By storing more tensile stress in the inner wraps of tape the compressive stress, caused by the added wraps, may be reduced.

Figure 5:
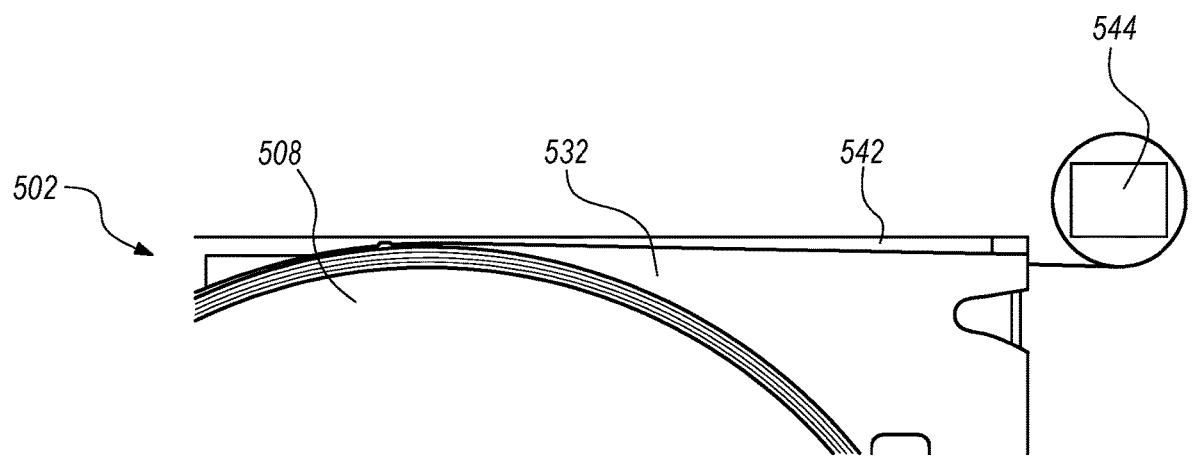
FIG. 5 is a simplified schematic illustration of a portion of an embodiment of the magnetic tape cartridge of the present invention with the magnetic tape cartridge housing exterior portion removed.

FIG. 5 is a simplified schematic illustration of a portion of an embodiment of the magnetic tape cartridge 502 with the magnetic tape cartridge housing exterior portion omitted for clarity. The magnetic tape 508 can be retained within the tape cartridge 502. The cartridge housing interior portion 532 can be configured to allow the magnetic tape 508 to exit the cartridge housing interior portion 532 and reach the drive guide roller 544.

In particular, as shown in FIG. 5, the tape cartridge 502 is somewhat similar or identical to that previously illustrated and described herein. However, some embodiments, changes have been made to the cartridge housing interior portion 532 and the cartridge wall 542 in order to enable the tape cartridge 502 to accommodate the magnetic tape 508 having a tape length that is greater than conventional magnetic tape in cartridge housings having the same form factor. In certain embodiments, the cartridge wall 542 can be slightly tapered. The cartridge wall 542 can have a wall center and a wall edge, the cartridge wall 542 can have a thickness that gradually and/or steadily increases from the wall center to the wall edge. The cartridge wall 542 can allow the tape media 502 to exit the cartridge housing interior portion 532 and can reach a drive guide roller 544 without contacting the cartridge wall 542. In some embodiments, material can be removed from the top and/or bottom of the cartridge housing interior portion 532.

Figure 6:
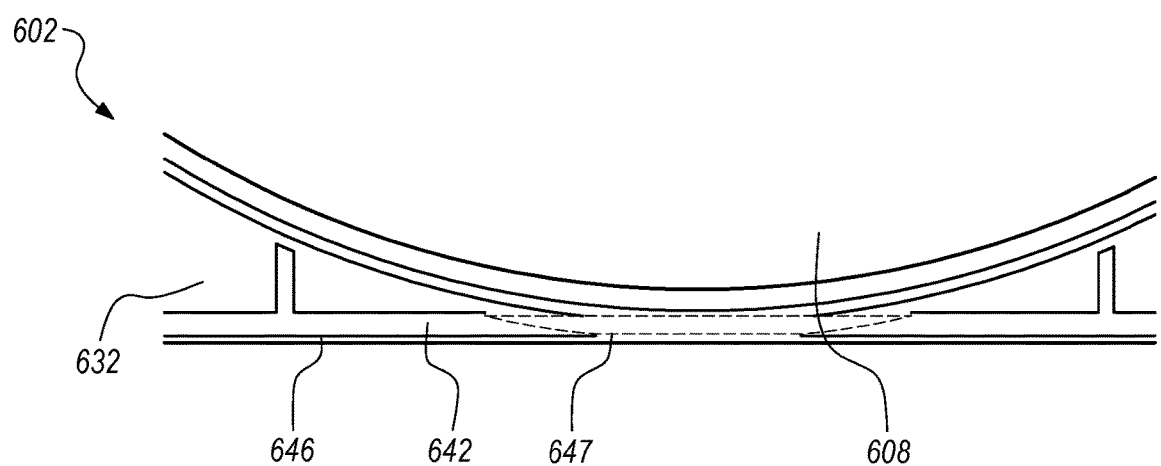
FIG. 6 is a simplified schematic illustration of another portion of an embodiment of the magnetic tape cartridge of the present invention with the magnetic tape cartridge housing exterior portion removed.

FIG. 6 is a simplified schematic illustration of another portion of an embodiment of the magnetic tape cartridge 602 with the magnetic tape cartridge housing exterior portion removed. In some embodiments, the tapered cartridge wall 647 (with the removed portion shown in phantom) allows the magnetic tape 608 of a larger size to rotate without coming into contact with the cartridge wall 642. In certain embodiments, the cartridge wall 642 is connected to a label recess 646. In some embodiments, the label recess 646 can be removed entirely to accommodate the magnetic tape 608 of a larger size. In some embodiments, with the label recess 646 removed, the cartridge wall 642 can have an increased cartridge wall thickness in areas where the magnetic tape 608 is in minimal clearance of the cartridge wall 642. Alternatively, in some embodiments, the label recess 646 can be tapered as previously described herein in order to provide room for the magnetic tape 608 of a larger size. In certain embodiments, other changes can be made to the cartridge housing interior portion 632, including removing material from the top or bottom of the cartridge housing interior portion 632.

Figure 7:
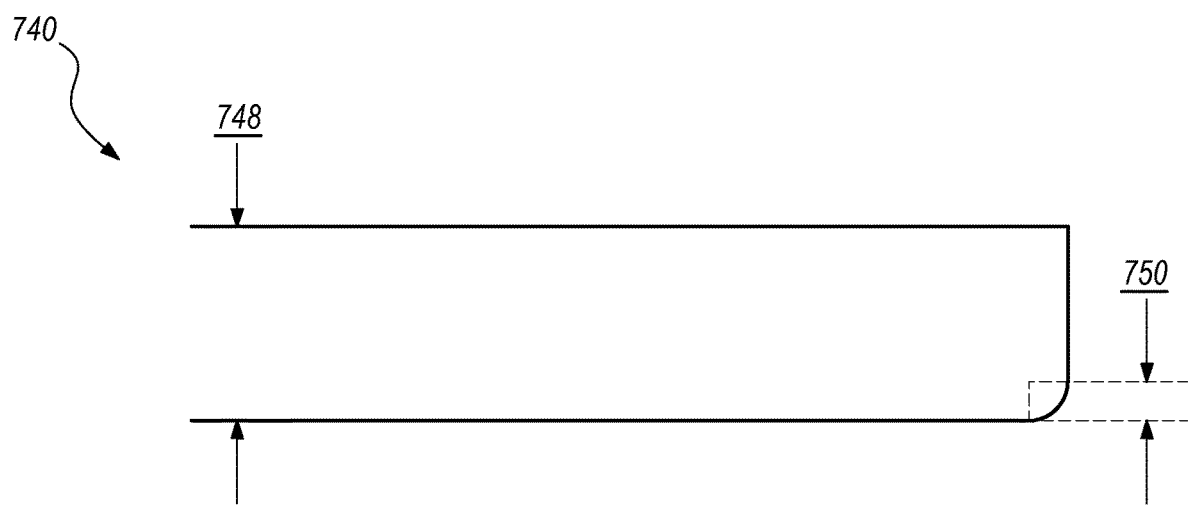
FIG. 7 is a simplified schematic illustration of an embodiment of the magnetic cartridge reel flange having features of the present invention.

FIG. 7 is a simplified schematic illustration of an embodiment of a cartridge flange 740 having features of the present invention. In some embodiments, the cartridge flange 740 can have a flange thickness 748. In some embodiments, the flange thickness 748 can be between approximately 2.60 millimeters and 3.20 millimeters. More particularly, in one non-exclusive alternative embodiment, the flange thickness 748 can be less than 2.90 millimeters, 2.80 millimeters or 270 millimeters. Alternatively, in some embodiments, the flange thickness 748 can be greater than approximately 3.20 millimeters or less than approximately 2.60 millimeters.

More specifically, as shown in FIG. 7, the cartridge flange 740 can have a flange outer radius of curvature 750, shown with dotted lines. In some embodiments, the flange outer radius of curvature 750 can be between approximately 0.05 millimeters and 0.50 millimeters. More particularly, in certain non-exclusive embodiments, the flange outer radius of curvature 750 can be less than approximately 0.05 millimeters, 0.10 millimeters, 0.15 millimeters, 0.20 millimeters, 0.25 millimeters, 0.30 millimeters, 0.35 millimeters, 0.40 millimeters or 0.50 millimeters. More particularly, in one non-exclusive alternative embodiment, the flange outer radius of curvature 750 can be less than 0.40 millimeters. Alternatively, in some embodiments, the flange outer radius of curvature 750 can be greater than approximately 0.50 millimeters or less than approximately 0.05 millimeters.

In some embodiments, the linear density can be cut in half and the track density can be effectively quadrupled, yielding a net two-fold increase in capacity and areal density. By appropriate selection of operating points, capacities can be increased further given the same media formulation, thereby providing for a higher ROI on media development. Similarly, the reduction in the linear density can result in a reduction in the complexity of the read/write head design affording less pressure to achieve operating performance targets. This strategy flies in the face of present roadmaps for increasing areal density and conventional thinking.

With the designs provided herein, the linear density can be significantly reduced, and the track density can be significantly increased to achieve higher capacities and higher areal densities. This decreases the impact on media evolution in that the lower linear density can result in significant reductions in head-media separation loss, reduced sensitivity to gap length loss and particle length loss.

These changes may place a significant burden on the track-following servo performance, enhanced tape path performance, and a significant reduction in track mis-registration due to environmental consideration and aging of media.

In certain embodiments, linear density may be lowered instead, while track density can be increased to compensate for the loss of linear density and also to provide areal density gains such that SNR with lower linear density compensates for SNR loss due to higher track density. With this design, an increase of areal densities using older or current generations of magnetic tape without lowering SNR achieve higher data capacities of tape cartridges.

In various embodiments, the present invention can increase the volume of media available for storage to approximately 29 cm$^3$ from approximately 20.7 cm$^3$ without changing the volume of the cartridge housing.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the magnetic tape cartridge have been illustrated and described herein, one or more features of any one embodiment can be combined with one or more features of one or more of the some embodiments, provided that such combination satisfies the intent of the present invention.

While a number of exemplary aspects and embodiments of the magnetic tape cartridge have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A tape media cartridge, comprising:
   a cartridge housing having a standard Ultrium form factor, the cartridge housing including a side wall having a wall center and a wall edge, the side wall having a side wall thickness that gradually increases from the side wall center to the side wall edge;
   a cartridge reel that is coupled to and retained within the cartridge housing;
   a tape media that is selectively wound onto the cartridge reel between a fully wound state, a partially wound state and an unwound state, the tape media forming a media hollow cylinder having a media outer diameter and a media inner diameter that varies depending upon the state of the tape media; and
   a label recess that is connected to the side wall, the label recess being tapered to accommodate the tape media;
   wherein when the tape media is in the fully wound state, a ratio of the media outer diameter to the media inner diameter is at least approximately 95:43.

2. The tape media cartridge of claim 1 wherein the side wall is tapered to accommodate the tape media.

3. The tape media cartridge of claim 1 wherein when the tape media is in the fully wound state, the tape media has a media width so that a ratio of the media inner diameter to the media width is less than approximately 43:13.

4. The tape media cartridge of claim 3 wherein when the tape media is in the fully wound state, a ratio of the media outer diameter to the media width is at least approximately 95:13.

5. The tape media cartridge of claim 1 wherein the cartridge reel includes a reel flange having an outer edge radius of curvature of less than 0.4 mm.

6. The tape media cartridge of claim 1 wherein the cartridge reel includes a reel flange having a flange thickness of less than 2.90 mm.

7. The tape media cartridge of claim 1 wherein the cartridge reel is at least partially formed from a glass filling.

8. The tape media cartridge of claim 1 wherein when the tape media is in the fully wound state, the media inner diameter is less than 43 mm.

9. The tape media cartridge of claim 1 wherein when the tape media is in the fully wound state, the media outer diameter is greater than 95 mm.

10. The tape media cartridge of claim 1 wherein when the tape media is in the fully wound state, the media width is greater than 13 mm.

11. The tape media cartridge of claim 1 wherein in the fully wound state, the media hollow cylinder has a volume of greater than 20.8 cm$^3$.

12. The tape media cartridge of claim 1 wherein the cartridge housing is at least partially formed with a glass filling.

13. A tape media cartridge, comprising:
   a cartridge housing having a standard Ultrium form factor, the cartridge housing including a side wall having a wall center and a wall edge, the side wall having a side wall thickness that gradually increases from the side wall center to the side wall edge, the cartridge housing including a label recess that is connected to the side wall;
   a tape media that is selectively wound onto the cartridge reel between a fully wound state, a partially wound state and an unwound state, the tape media having a media width, the tape media forming a media hollow cylinder having a media inner diameter and a media outer diameter that varies depending upon the state of the tape media, wherein the label recess is tapered to accommodate the tape media; and a cartridge reel that is coupled to and retained within the cartridge housing, the cartridge reel including a reel flange having an outer edge radius of curvature of less than 0.3 mm, the reel flange having a flange thickness of less than 2.85 mm;

wherein when the tape media is in the fully wound state, a ratio of the media outer diameter to the media inner diameter is at least approximately 95:43, and a ratio of the media inner diameter to the media width is less than approximately 40:13.

14. The tape media cartridge of claim 1 wherein the cartridge housing is at least partially formed from one of a plastic, a metal, and an adhesive.

15. The tape media cartridge of claim 1 wherein the cartridge reel is at least partially formed from one of a plastic, a metal, and an adhesive.

16. The tape media cartridge of claim 13 wherein the cartridge reel is at least partially formed from a glass filling.

17. The tape media cartridge of claim 13 wherein the cartridge housing is at least partially formed from a glass filling.

18. The tape media cartridge of claim 13 wherein the cartridge housing is at least partially formed from one of a plastic, a metal, and an adhesive.

19. The tape media cartridge of claim 13 wherein in the fully wound state, the media hollow cylinder has a volume of greater than 20.8 cm$^3$.

20. The tape media cartridge of claim 13 wherein the reel flange is at least partially formed from a glass filling.

\* \* \* \* \*